(12) United States Patent
Vogel et al.

(10) Patent No.: US 7,651,066 B2
(45) Date of Patent: Jan. 26, 2010

(54) DEVICE FOR PNEUMATIC CONTROL

(75) Inventors: Klaus Vogel, Barsbüttel (DE); Michael Litzenberg, Geesthacht (DE)

(73) Assignees: Norgren AG, Balterswil (CH); KHS Corpoplast GmbH & Co. KG, Hamburg (DE)

( * ) Notice: Subject to any disclaimer, the term of this patent is extended or adjusted under 35 U.S.C. 154(b) by 0 days.

(21) Appl. No.: 10/183,424

(22) Filed: Jun. 28, 2002

(65) Prior Publication Data

US 2003/0019353 A1 Jan. 30, 2003

(30) Foreign Application Priority Data

Jun. 29, 2001 (DE) ................ 101 31 557

(51) Int. Cl.
*F16K 31/00* (2006.01)
(52) U.S. Cl. ........................ 251/63.5; 251/63
(58) Field of Classification Search .......... 251/62, 251/63, 63.4, 63.5, 63.6, 357
See application file for complete search history.

(56) References Cited

U.S. PATENT DOCUMENTS

| 3,155,367 | A |   | 11/1964 | Gifford |
| 4,267,861 | A |   | 5/1981  | Roth |
| 4,270,727 | A | * | 6/1981  | Norman ................ 251/63.4 |
| 4,479,772 | A | * | 10/1984 | Kleimenhagen .......... 425/526 |
| 4,526,341 | A | * | 7/1985  | Thomas ................ 251/63.5 |
| 4,644,969 | A |   | 2/1987  | Watanabe |
| 4,872,638 | A | * | 10/1989 | Thompson et al. ......... 251/54 |
| 6,000,416 | A | * | 12/1999 | Kingsford et al. ........ 251/63.5 |

FOREIGN PATENT DOCUMENTS

| CH | DT 23 52 926 A1 | 4/1975  |
| DE | 26 13 658 C2    | 10/1977 |
| DE | 42 12 583 A1    | 10/1993 |
| DE | 43 40 291 A1    | 6/1995  |
| DE | 199 56 575 A1   | 5/2001  |

\* cited by examiner

*Primary Examiner*—John K Fristoe, Jr.
(74) *Attorney, Agent, or Firm*—Harness, Dickey & Pierce, PLC

(57) ABSTRACT

A device used for pneumatic control, includes a control piston carried in a cylinder. The control piston is mounted so as to be movable in the direction of a longitudinal piston axis, and a primary flow path that can be closed by the control pressure passes through the cylinder. The control piston is provided with a control surface that faces a control chamber of the cylinder and that is designed to transmit a control force to the control piston. The control piston is made at least partially of a plastic.

35 Claims, 7 Drawing Sheets

DEVICE FOR PNEUMATIC CONTROL

The present application hereby claims priority under 35 U.S.C. Section 119 on German Patent application number 101 31 557.0 filed Jun. 29, 2001, the entire contents of which are hereby incorporated by reference.

FIELD OF THE INVENTION

The invention generally relates to a device for pneumatic control. Preferably, it relates to one having a control piston carried in a cylinder that is mounted so as to be movable in the direction of a longitudinal piston axis. More preferably, it relates to one wherein a primary flow path that can be closed by the control piston passes through the cylinder and wherein control piston is provided with a control surface that faces a control chamber of the cylinder and one that is designed to transmit a control force to the control piston.

BACKGROUND OF THE INVENTION

Devices for pneumatic control are used in particular in the manufacture of blow-molded containers to be able to achieve delivery of one or more blow pressures that is coordinated with execution of the blow molding process.

In this type of container molding using blow pressure action, preforms of a thermoplastic material, for example preforms of PET (polyethylene terephthalate), are delivered to different processing stations within a blow molding machine. Typically, such a blow molding machine has a heater unit and a blow unit, in the vicinity of which the previously temperature treated preform is expanded by biaxial orientation to a container. The expansion is accomplished with the use of compressed air, which is introduced into the preform to be expanded. The process sequence of such an expansion is explained in DE-OS 43 40 291.

The basic structure of a blow station for molding containers is described in DE-OS 42 12 583. Options for temperature treatment of the preforms are explained in DE-OS 23 52 926.

Within the device for blow molding, the preforms and the blow-molded containers can be transported by means of various handling devices. One proven technique in particular is the use of transport mandrels onto which the preforms are placed. The preforms can also be handled with other carrying devices, however. For example, the use of grippers for handling preforms, and the use of expansion mandrels that can be introduced into a mouth area of the preform for the purpose of holding, are also among the available designs.

The aforementioned handling of the preforms takes place on the one hand as part of the so-called two-stage process, in which the preforms are first manufactured in an injection molding process, then are stored temporarily, before later being conditioned with respect to their temperature and blow molded into containers. On the other hand, application is also found in the so-called one-stage process, in which the preforms are appropriately temperature treated and then blow molded immediately after their production by injection molding and adequate hardening.

With regard to the blow stations employed, various embodiments are known. In blow stations that are arranged on rotating transport wheels, one frequently encounters mold supports that swing open in a book-like fashion. However, it is also possible to use mold supports that slide relative to one another or operate in other ways. In stationary blow stations, which are especially suitable for accommodating multiple cavities for container molding, plates that typically are arranged parallel to one another are used as molds.

The devices for pneumatic control used to supply compressed air to the blow stations are typically implemented as high pressure valves in which a control piston is positioned by a control pressure in such a way that the control piston either closes or opens a flow path for the blow pressure. To ensure a proper seal, the known control pistons are usually vulcanized with an elastomer in the area of a seal face.

A particular disadvantage of the known control pistons is that, because of the metallic construction of the control piston, it is necessary to avoid direct contact with the wall of the surrounding cylinder, since otherwise severe wear would occur. To avoid this contact, guide bands of plastic or similar soft materials are used, which are employed as guide elements, similar to the arrangement of piston rings. For these guide bands, appropriate recesses must be placed in the region of the piston wall, resulting in corresponding manufacturing costs. Moreover, installation of the guide bands also has a corresponding cost.

SUMMARY OF THE INVENTION

An object of an embodiment of the present invention is to design a device wherein the structural design is improved.

An object may be achieved in accordance with an embodiment of the invention in that the control piston is made at least partially of a plastic.

Due to the construction of the control piston of at least partially plastic, metal-to-metal contact with the wall of the cylinder can be avoided, at least in the areas made of plastic. Consequently, separate guide bands can be eliminated. The construction of the control piston of plastic additionally results in a reduced weight, and thus in a reduced inertia as well as reduced friction during positioning of the piston. As a result, smaller positioning forces are required than in a metal implementation of the control piston.

Due to this construction, it is thus also possible to reduce the maximum control pressure, thereby achieving both a considerable reduction in switching time and a considerable increase in operating life. The reduction of the control pressure also brings about a reduction in noise so that smaller and thus more cost-effective noise dampers can be used with regard to the equipment.

Ease of assembly is facilitated in that the control piston can be designed in at least two parts.

In particular, in a multi-piece implementation of the control piston, the control piston may include a shank cap.

Simple assembly of the individual components of the control piston can be achieved by the shank cap being attached via a snap-on connection in the vicinity of a piston shank of the control piston.

In particular, secure retention of the shank cap may be achieved by the piston shank including a groove for retaining the shank cap. However, it is also possible to provide the piston shank with an external profile that engages in a corresponding mating profile of the shank cap.

Positive fastening of the shank cap may also be supported by the shank cap engaging the groove with a ridge. Alternatively, the shank cap can also be equipped with a groove in which a corresponding ridge engages.

To avoid vulcanized-on seals, the shank cap can be made at least partially of plastic.

Especially favorable material properties can be achieved by the shank cap being made at least partially of PETP.

To improve sealing, it is proposed that at least one seal be arranged in the vicinity of the piston shank.

To support the use of relatively small control pressures, provision can be made for the control surface to be dimensioned larger than the cross-sectional area of the piston shank.

For a compact design implementation, it may be advantageous for the control surface to be positioned in the vicinity of a piston head facing away from the shank cap.

Providing the piston head with at least one seal also may contribute to avoiding pressure losses.

In accordance with one embodiment of the invention, it is intended for the control piston to be made partially of metal.

The use of special guide bands on the control piston can be completely avoided in that both the piston shank and the piston head are made of plastic.

Particularly favorable material properties can be achieved by the control piston being made at least partially of PETP.

To assist in the generation of the actuating force for the control piston, it is proposed that a control chamber for delivery of a control pressure be at least partially delimited by the control surface.

Especially in a metallic implementation of the control piston, it is intended that the control piston be provided with a damping element for end point damping.

Essentially equal actuating forces for closing the valve and for holding the valve in the closed position can be provided in that the control piston has a piston shank whose cross-sectional area is essentially equal in size to a cross-sectional area of a flow orifice of the primary flow path that faces the interior cylinder chamber and can be closed by the control piston.

To ensure defined positioning of the shank cap relative to the piston shank, the shank cap may be retained by the control piston with preloading.

BRIEF DESCRIPTION OF THE DRAWINGS

Example embodiments of the invention are represented schematically in the drawings. Shown are.

DETAILED DESCRIPTION OF THE PREFERRED EMBODIMENTS

Figure 1:
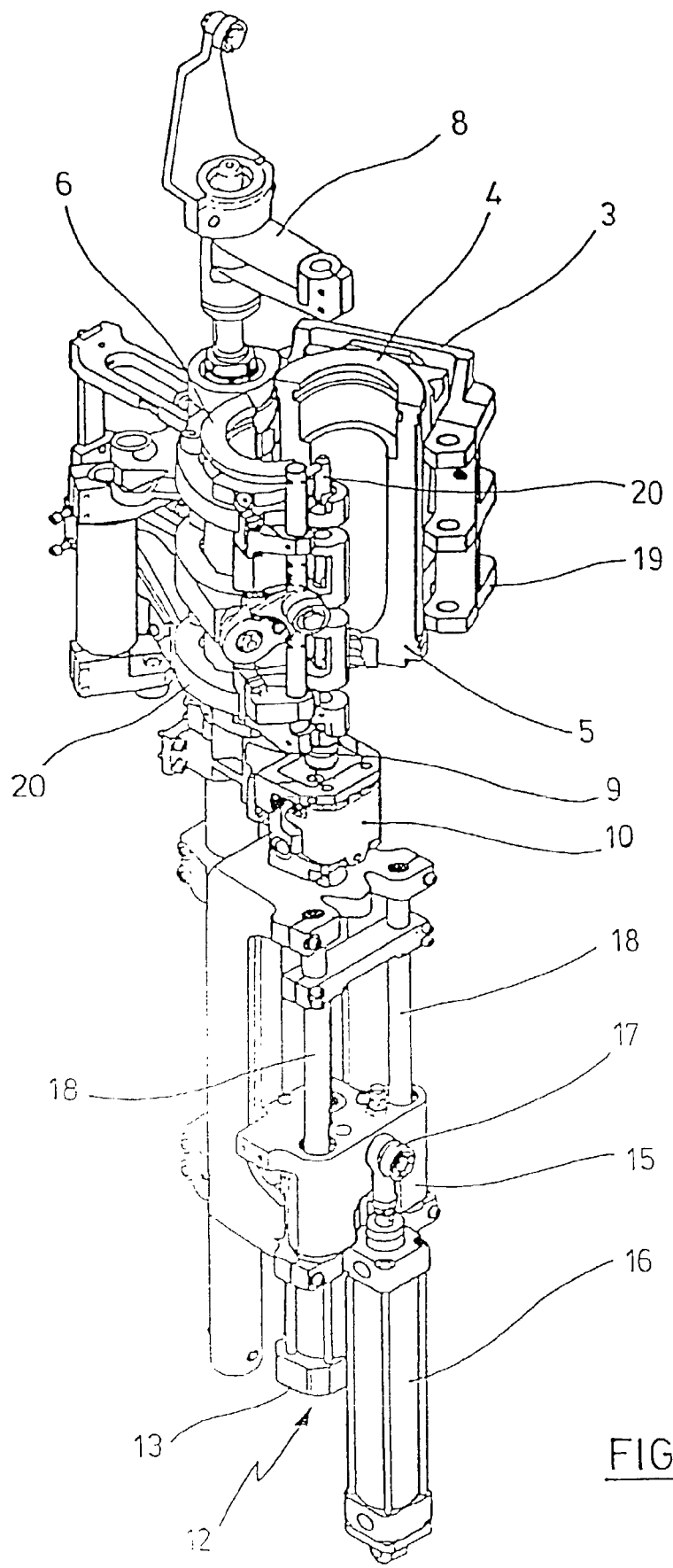
FIG. 1 a perspective view of a blow station for manufacturing containers of preforms, FIG. 2 a longitudinal section through a blow mold in which a preform is stretched and expanded, FIG. 3 a sketch to illustrate a basic structure of a device for blow molding containers, FIG. 4 a modified heating section with increased heating capacity, FIG. 5 a schematic vertical section through a high pressure valve, FIG. 6 a schematic representation of a plastic control piston that is carried in the control cylinder, and FIG. 7 a conceptual representation of a two-piece control piston that is carried with a piston shank in a sleeve.
Figure 2:
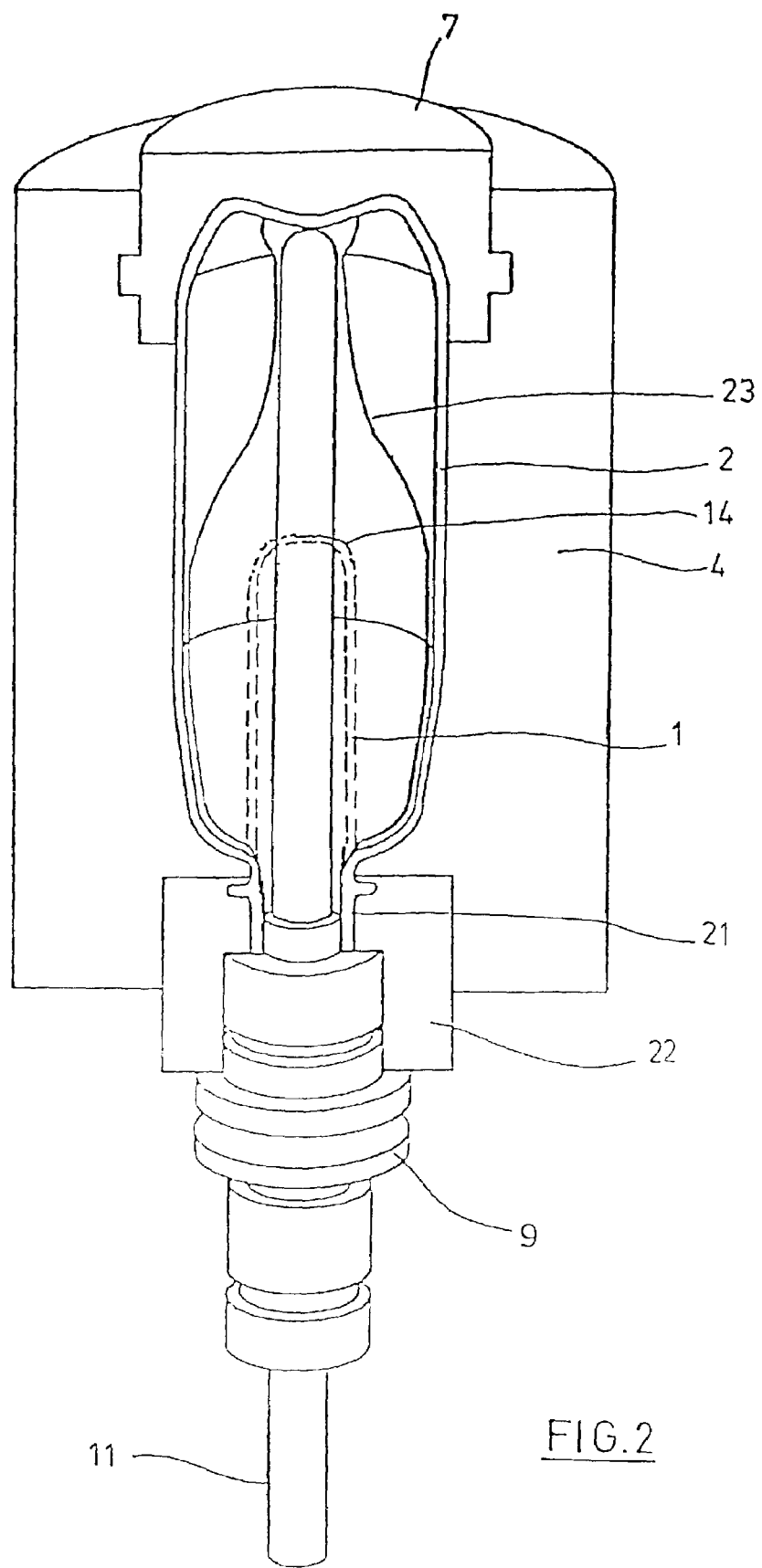

The device for pneumatic control can for example be used to control the delivery of compressed air in a device for blow molding. The basic structure of a device for forming preforms (1) into containers (2) is shown in FIG. 1 and FIG. 2.

The device for forming the container (2) consists essentially of a blow station (3), which is equipped with a blow mold (4) into which can be inserted a preform (1). The preform (1) can be an injection-molded part of polyethylene terephthalate. To permit insertion of the preform (1) in the blow mold (4) and to permit removal of the finished container (2), the blow mold (4) is composed of mold parts (5, 6) and a bottom piece (7) that can be positioned by a lifting apparatus (8). The preform (1) can be held in the area of the blow station (3) by a transport mandrel (9), which together with the preform (1) passes through a plurality of treatment stations within the device. However, it is also possible to insert the preform (1) directly in the blow mold (4) through the use of grippers, for example, or other handling devices.

To permit the delivery of compressed air, a connecting flask (10) is arranged beneath the transport mandrel (9); this flask supplies compressed air to the preform (1) and simultaneously provides sealing relative to the transport mandrel (9). In a modified design, it is also possible to use fixed compressed air lines, of course.

Stretching of the preform (1) is accomplished with the aid of a stretching rod (11), which is positioned by a cylinder (12). However, it is also possible to accomplish mechanical positioning of the stretching rod (11) by cam segments acted upon by follower rollers. The use of cam segments is particularly useful when a plurality of blow stations (3) are arranged on a rotating blow wheel. Use of cylinders (12) is useful when stationary blow stations (3) are provided.

In the embodiment shown in FIG. 1, the stretching system is designed such that a tandem arrangement of two cylinders (12) is provided. Before the start of the actual stretching process, the stretching rod (11) is first moved by a primary cylinder (13) into the region of the bottom (14) of the preform (1). During the actual stretching process, the primary cylinder (13) with extended stretching rod is positioned, together with a carriage (15) bearing the primary cylinder (13), by a secondary cylinder.(16) or via a cam control. In particular, the intent is to use cam control of the secondary cylinder (16) in such a way that a current stretching position is given by a guide roll (17), which slides along a curved path during the stretching process. The guide roll (17) is pressed against the guide path by the secondary cylinder (16). The carriage (15) slides along two guide elements (18).

After the mold parts (5, 6) in the vicinity of supports (19, 20) have closed, the supports (19, 20) lock relative to one another by means of a locking device (20).

As shown in FIG. 2, provision is made for the use of separate threaded inserts (22) in the area of the blow mould (4) to accommodate the various forms of a mouth section (21) of the preform (1).

In addition to the blow-molded container (2), FIG. 2 also shows the preform (1), indicated by dashed lines, and a developing container blow (23) in schematic form.

Figure 3:
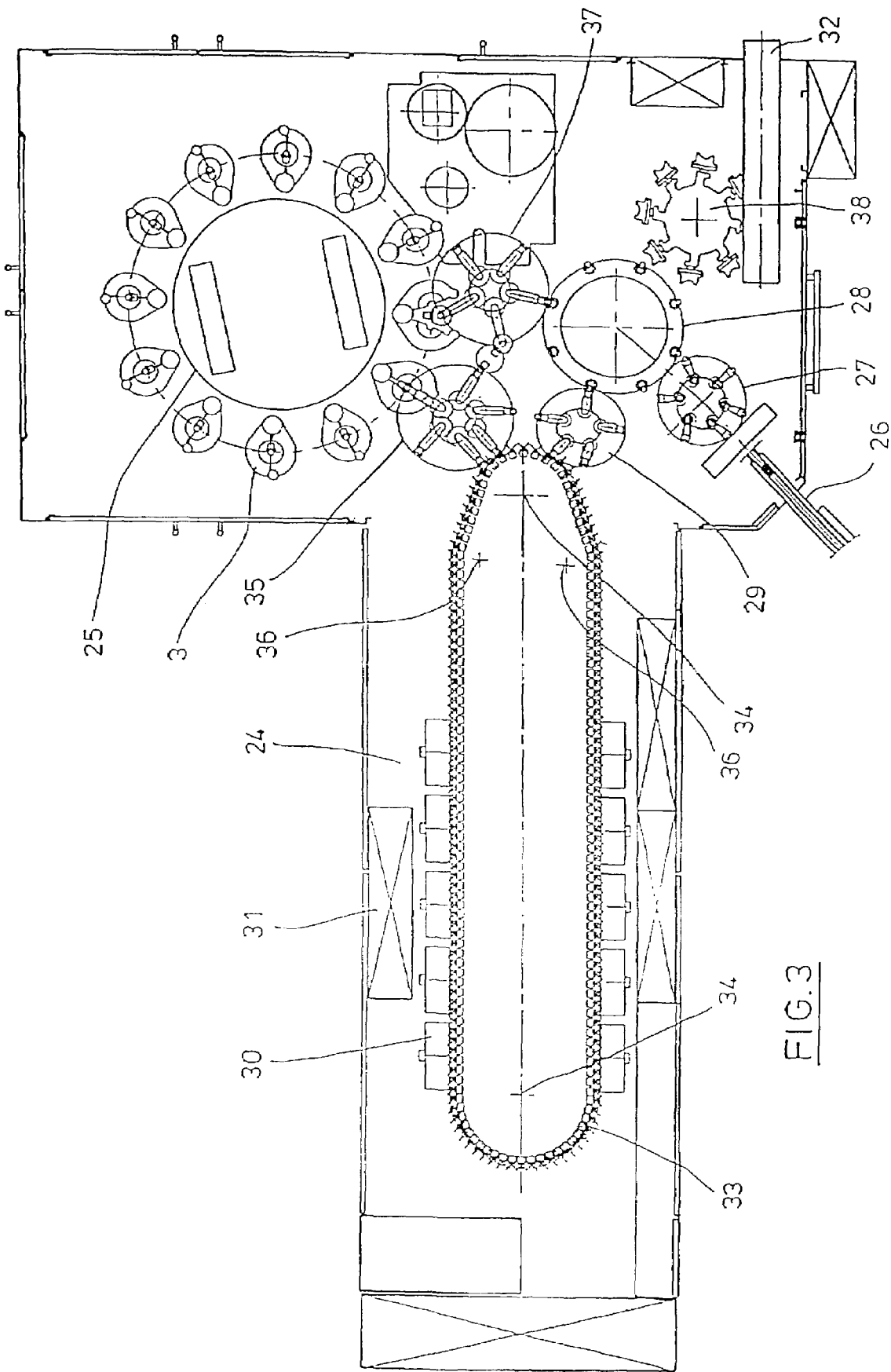

FIG. 3 shows the basic structure of a blow molding machine that is equipped with a heating section (24) as well as a rotating blow wheel (25). Starting at a preform inlet (26), the preforms (1) are transported by transfer wheels (27, 28, 29) into the area of the heating section (24). Arranged along the heating section (24) are radiant heaters (30) and blowers (31) for temperature treatment of the preforms (1). After sufficient temperature treatment of the preforms (1), they are transferred to the blow wheel (25); the blow stations (3) are arranged near the latter. The finished, blow molded containers (2) are delivered to an output section (32) by additional transfer wheels.

To be able to mold a preform (1) into a container (2) in such a way that the container (2) has material properties that ensure a long shelf life of foods, more particularly beverages, placed in the container (2), special process steps must be followed during the heating and orientation of the preforms (1). Moreover, beneficial effects can be achieved by adhering to special dimensioning guidelines.

A variety of plastics can be used as the thermoplastic material. Examples of plastics that may be used include PET, PEN and polypropylene.

Expansion of the preform (1) during the orientation process is accomplished through the delivery of compressed air. The delivery of compressed air is divided into a preblow phase, in which gas, for example compressed air, is delivered at a low pressure level, and a subsequent primary blow phase, in which gas is delivered at a higher pressure level. Typically, compressed air at a pressure in the range from 10 bar to 25 bar is used during the preblow phase, and compressed air at a pressure in the range from 25 bar to 40 bar is used during the primary blow phase.

It can also be seen from FIG. 3 that, in the embodiment shown, the heating section (24) is made up of a plurality of circulating transport elements (33) that are linked in the manner of a chain and are carried along by guide wheels (34). In particular, the intent is to cover an essentially rectangular footprint by the chainlike arrangement. In the embodiment shown, a single relatively large guide wheel (34) is used in the vicinity of the portion of the heating section (24) that faces the transfer wheel (29) and a feed wheel (35), and two comparatively small guide wheels (36) are used in the vicinity of adjacent deflections. However, any other desired guide systems are also possible, of course.

The arrangement shown has proven to be especially useful for facilitating the closest possible arrangement of the transfer wheel (29) and the feed wheel (35) relative to one another, since three guide wheels (34, 36) are positioned in the vicinity of the relevant portion of the heating section (24), in each case with the smaller guide wheels (36) located in the vicinity of the transition to the linear stretches of the heating section (24) and the larger guide wheel located in the immediate transfer region to the transfer wheel (29) and to the feed wheel (35). As an alternative to the use of chain-like transport elements (33), it is also possible to use a rotating heat wheel, for example.

After blow-molding of the containers (2) is completed, they are removed from the area of the blow station (3) by a discharge wheel (37) and transported to the output section (32) via the transfer wheel (28) and an output wheel (38).

Figure 4:
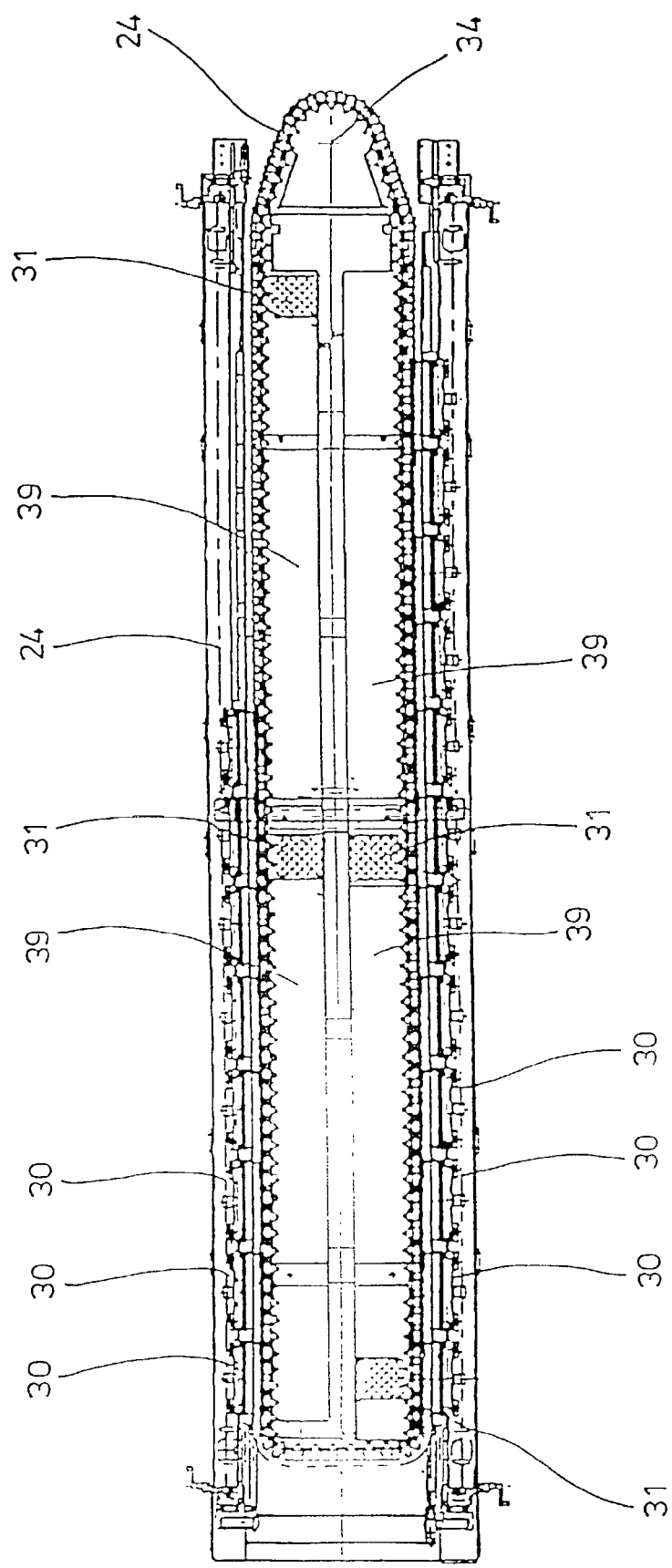

In the modified heating section (24) shown in FIG. 4, a larger quantity of preforms (1) can be temperature treated per unit time due to the larger number of radiant heaters (30). Here, the blowers (31) direct cooling air to the vicinity of cooling air ducts (39), each of which lies opposite the associated radiant heater (30) and discharges the cooling air through outlet openings. The arrangement of the outlet openings achieves a direction of flow for the cooling air that is essentially perpendicular to the transport direction of the preforms (1). The cooling air ducts (39) can provide reflectors for the radiated heat in the vicinity of the surfaces opposite the radiant heaters (30); it is also possible to implement cooling of the radiant heaters (30) by using the discharged cooling air.

Figure 5:
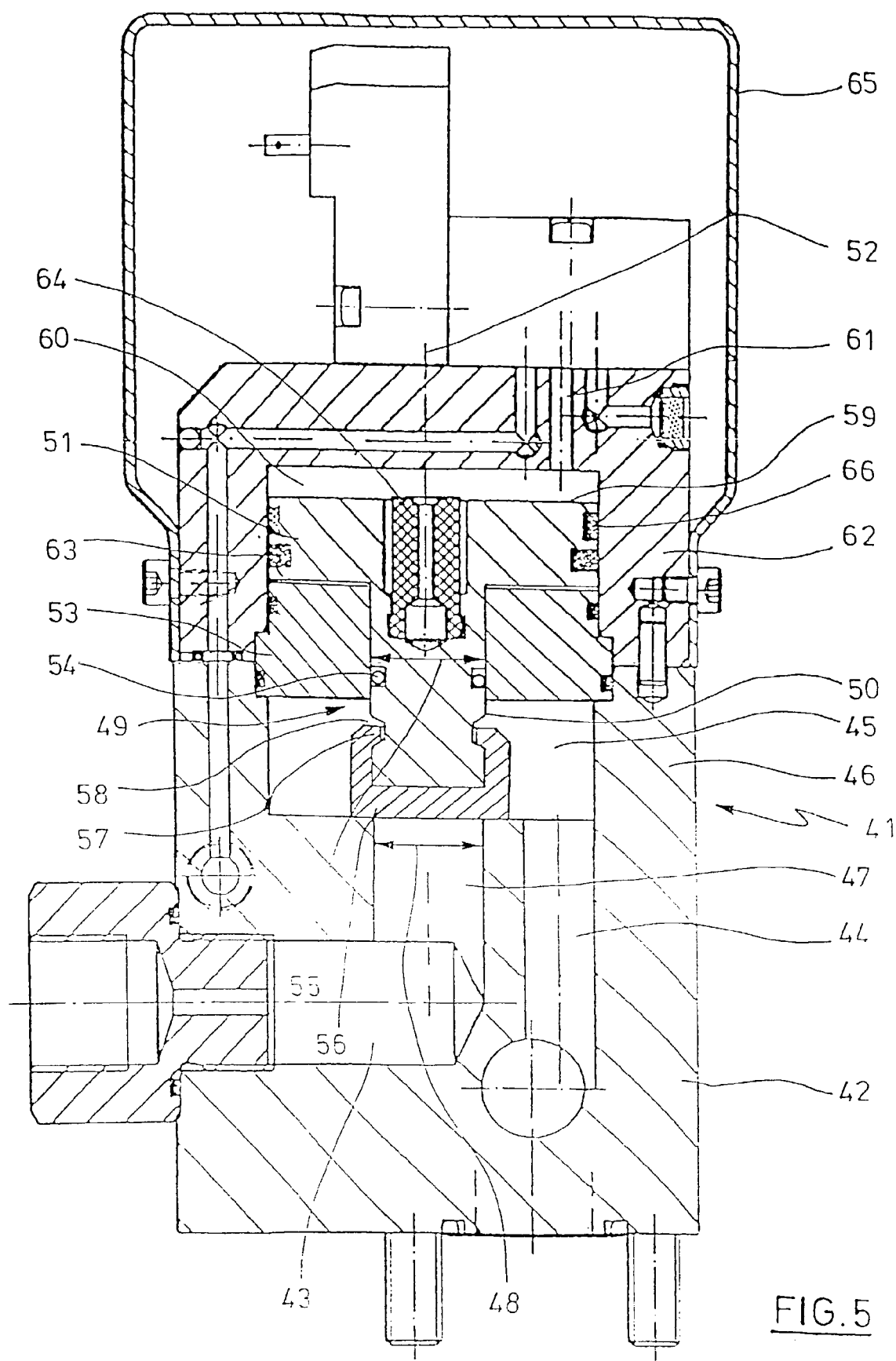

FIG. 5 shows a vertical section through a device for pneumatic control embodied as a high pressure valve (41). Arranged in a valve base (42) are an inlet channel (43) and an outlet channel (44) that open into an interior cylinder chamber (45), which is at least partially delimited by a cylinder wall (46) of the valve base (42). The section of the inlet channel (43) that faces the interior cylinder chamber (45) provides a primary flow path (47) for the high pressure to be controlled with a flow orifice (48).

A control piston (49), including primarily a piston shank (50) and a piston head (51), is carried within the interior cylinder chamber (45). The piston shank (50) and the piston head (51) extend essentially symmetrically along a longitudinal piston axis (52), and together form a mushroom-shaped basic structure for the control piston (49).

The piston shank (50) extends through a piston sleeve (53) held by the valve base (42) and is sealed relative to the piston sleeve (53) with a seal (54). The seal (54) can take the form of an O-ring, for example.

In the embodiment shown, the piston shank (50) has a cross-sectional area (55) that is dimensioned essentially the same as the flow orifice (48). In the embodiment shown in FIG. 5, a shank cap (56) is placed on the piston shank (50) in the section that faces away from the piston head (51). In particular, the intent is to secure the shank cap (56) with a ridge (57) in a groove (58) of the piston shank (50). In an especially simple fashion, this can be accomplished in the form of a snap-on connection if the shank cap (56) implementation is sufficiently elastic.

The piston head (51) has, in the section that faces away from the piston shank (50), a control surface (59) that can be acted upon by a control pressure for positioning the control piston (49) within the interior cylinder chamber (45). Extending adjacent to the control surface (59) is a control chamber (60), into which discharges a feed line (61) for the control pressure.

The control chamber (60) is partially delimited by a cylinder head (62) that is held by the valve base (42). The piston head (51) is sealed relative to an inner wall of the cylinder head (62) by a seal (63). To ensure end point damping during positioning of the control piston (49), a damping element (64) can be inserted in the piston head (51).

In order to provide a compact embodiment, it is possible to place a cylinder fairing (65) or a spacer strap on the cylinder head (62) to protect the upper section of the cylinder head (62) from external mechanical stresses. When the control piston (49) is made partially of metal, guide elements (66) of plastic or similar soft materials are used in addition to the seals (54, 63) in order to prevent metal-to-metal contact between the control piston (49) and the cylinder wall (46), which likewise generally is made of metal, or the cylinder sleeve (53).

FIG. 5 shows the high pressure valve (41) with the primary flow path (47) in a closed state. The piston shank (50) is placed, with the shank cap (56), against the edge of the primary flow path (47) and seals the interior cylinder chamber (45) from the primary flow path (47). In the area of the control chamber (60), a control pressure is present that acts upon the control surface (59) and generates a force acting on the control piston (49) that is greater than the force from the primary pressure acting on the shank cap (56). Reliable closing of the high pressure valve (41) is ensured by this means. When the control pressure drops, the control piston (49) is moved in the direction of the longitudinal piston axis (52) by the high pressure, and the high pressure can escape from the primary flow path (47) through the interior cylinder chamber (47) into the region of the outlet channel (44). As a result, the high pressure valve (41) is in an open state.

When the control pressure rises again, the control piston (49) returns to the original position and seals the primary flow path (47) again. Because the cross-sectional area (55) of the piston shank (50) and the flow orifice (48) of the primary flow path (47) have essentially equal dimensions in the embodiment shown, essentially the same forces with regard to the high pressure act on the control piston (49) in both the open and closed states of the high pressure valve (41). As a result, essentially the same control forces are required for closing the valve as for holding the valve closed.

In accordance with a preferred embodiment, the intent is to construct the control piston (49) completely of plastic. The guide elements (66) can then be eliminated entirely. A further intent is to implement the piston shank (50) and the piston head (51) together and in a single piece from the same plastic.

For example, PETP can be used here. In the event of a partially metal embodiment, use of aluminum, in particular, is intended.

Plastic is used preferentially for implementation of the shank cap (56), as well. Here, too, use of PETP, for example, is intended.

In accordance with typical dimensioning in an application for the switching of blow pressures, the piston head (51) is given a diameter of approximately 50 mm. A typical diameter of the piston shank (50) is approximately 14 mm to 20 mm, especially 18 mm, and a typical diameter of the flow orifice (48) is likewise approximately 14 mm to 20 mm, especially 18 mm. With such dimensioning, a control pressure of less than 10 bar generally proves sufficient for switching a primary pressure of maximum 40 bar.

Figure 6:
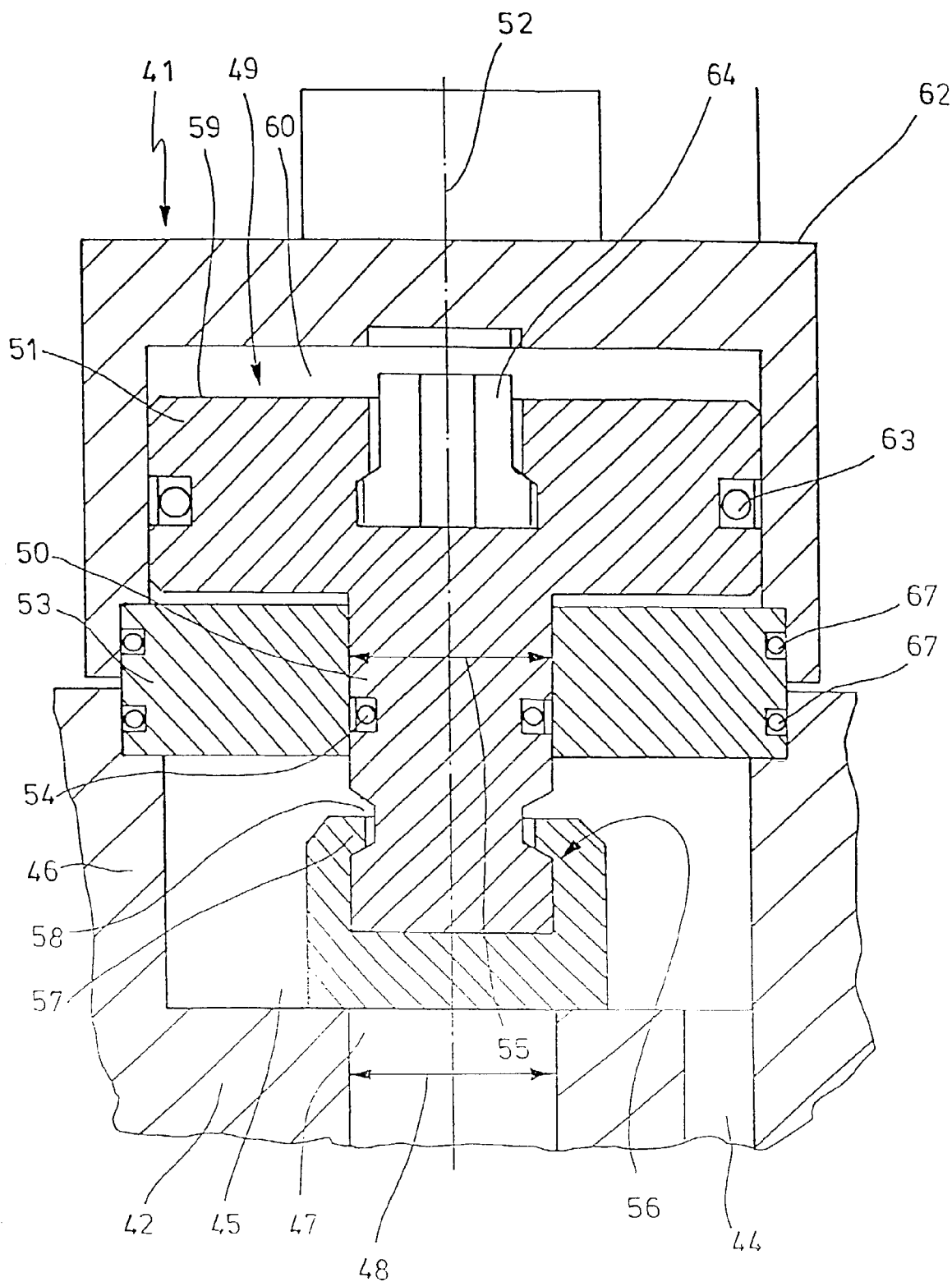

FIG. 6 shows a partial view of a longitudinal section of a high pressure valve (41) with a control piston (49) made entirely of plastic. The control piston (49) consequently only has the seals (54, 63), and can be implemented without guide elements (66). It can also be seen in FIG. 6 that seals (67) are arranged between the piston sleeve (53) and the valve base (42) or cylinder head (62), in order to ensure a highly effective seal. The seals (67) can be implemented as O-rings, for example.

Figure 7:
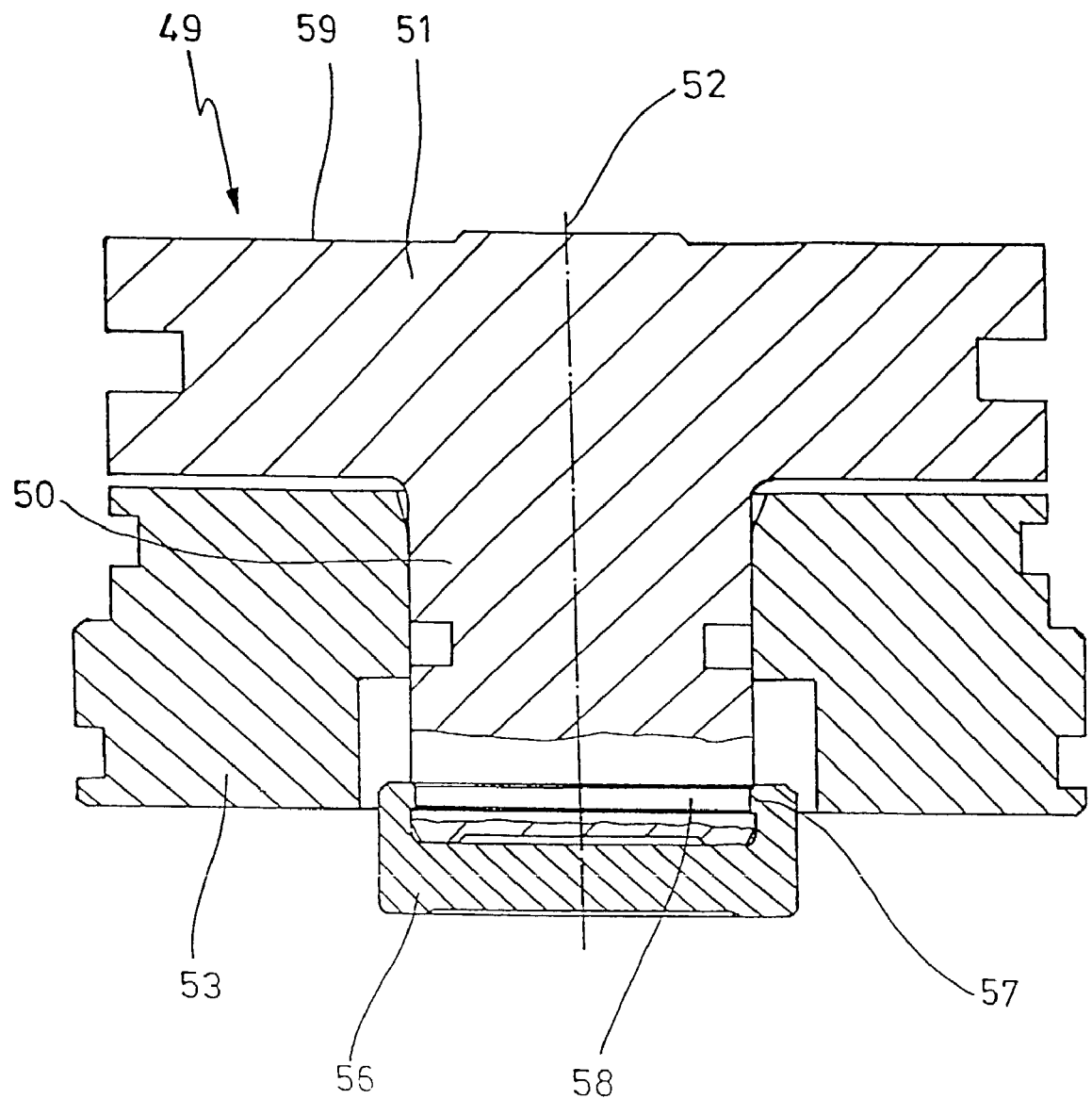

FIG. 7 again illustrates the arrangement of the shank cap (56) in the vicinity of the piston shank (50), as well as the arrangement of groove-like indentations in the control piston (49) and in the vicinity of the piston sleeve (53) to accommodate the seals (54, 63, 67). To make it possible for the interior cylinder chamber (45) to have small dimensions in the direction of the longitudinal piston axis (52), in the embodiment shown in FIG. 7 an indentation (68) is arranged in the vicinity of the piston sleeve (53) to accommodate the shank cap (56) in the open state of the high pressure valve (41).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A device for high pressure pneumatic control, comprising:

a control piston, carried in a cylinder that is mounted so as to be movable in the direction of a longitudinal piston axis, wherein a primary flow path that can be closed by the control piston passes through the cylinder and the primary flow path is arranged in a manner that the control piston is movable in a direction of the longitudinal axis of the control piston and the control piston is configured to be moved in the direction of the longitudinal axis of the control piston by a first pressure if a control pressure is reduced and wherein the control piston is made at least partially of a non-elastomer plastic and includes, a control surface, facing a control chamber of the cylinder and designed to transmit a control force to the control piston, and wherein the portions of the control piston in contact with the primary flow path are a non-elastomer plastic and a machine for blow molding thermoplastic material in which the pneumatic control is arranged, the machine having a rotatable blowing wheel and blow molding station arranged on the rotatable blowing wheel, the device for high pressure pneumatic control is configured to control blow pressure of the blow molding stations, wherein the blow pressure to be controlled is in the range of about 10 bar to about 40 bar.

2. A device in accordance with claim 1, wherein the control piston is designed in at least two parts.

3. A device in accordance with claim 2, wherein the control piston includes a shank cap.

4. A device in accordance with claim 2, wherein the control piston is made partially of metal.

5. A device in accordance with claim 2, wherein the control piston is provided with a damping element for end point damping.

6. A device in accordance with claim 2, wherein the control piston includes a piston shank whose cross-sectional area is dimensioned so as to be essentially equal to a cross-sectional area of a flow orifice of the primary flow path, closable by the control piston and facing an interior cylinder chamber.

7. A device in accordance with claim 1, wherein the control piston includes a shank cap.

8. A device in accordance with claim 7, wherein the shank cap is attached via a snap-on connection in the vicinity of a piston shank of the control piston.

9. A device in accordance with claim 8, wherein the piston shank includes a groove for retaining the shank cap.

10. A device in accordance with claim 9, wherein the shank cap engages the groove with a ridge.

11. A device in accordance with claim 10, wherein the shank cap is made at least partially of plastic.

12. A device in accordance with claim 10, wherein the shank cap is made at least partially of PETP.

13. A device in accordance with claim 9, wherein the shank cap is made at least partially of plastic.

14. A device in accordance with claim 9, wherein the shank cap is made at least partially of PETP.

15. A device in accordance with claim 8, wherein at least one seal is arranged in the vicinity of the piston shank.

16. A device in accordance with claim 15, wherein the at least one seal is arranged in a groove that extends in the area where the control piston is constructed of plastic.

17. A device in accordance with claim 8, wherein the control surface is dimensioned larger than the cross-sectional area of the piston shank.

18. A device in accordance with claim 8, wherein both the piston shank and a piston head are made of plastic.

19. A device in accordance with claim 8, wherein the shank cap is made at least partially of plastic.

20. A device in accordance with claim 8, wherein the shank cap is made at least partially of PETP.

21. A device in accordance with claim 7, wherein the shank cap is made at least partially of plastic.

22. A device in accordance with claim 7, wherein the shank cap is made at least partially of PETP.

23. A device in accordance with claim 7, wherein the control surface is positioned in the vicinity of a piston head facing away from the shank cap.

24. A device in accordance with claim 23, wherein the piston head is provided with at least one seal.

25. A device in accordance with claim 7, the shank cap is retained by the control piston with preloading.

26. A device in accordance with claim 7, wherein the control piston is made partially of metal.

27. A device in accordance with claim 7, wherein the control piston is provided with a damping element for end point damping.

28. A device in accordance with claim 7, wherein the control piston includes a piston shank whose cross-sectional area is dimensioned so as to be essentially equal to a cross-sectional area of a flow orifice of the primary flow path, closable by the control piston and facing an interior cylinder chamber.

29. A device in accordance with claim 1, wherein the control piston is made partially of metal.

30. A device in accordance with claim 1, wherein the control piston is made at least partially of PETP.

31. A device in accordance with claim 1, wherein the control chamber for delivery of a control pressure is at least partially delimited by the control surface.

32. A device in accordance with claim 1, wherein the control piston is provided with a damping element for end point damping.

33. A device in accordance with claim 1, wherein the control piston includes a piston shank whose cross-sectional area is dimensioned so as to be essentially equal to a cross-sectional area of a flow orifice of the primary flow path, closable by the control piston and facing an interior cylinder chamber.

34. A device in accordance with claim 1, wherein the control piston is constructed of plastic in the area of the control surface.

35. A device in accordance with claim 1, wherein the section of the control piston facing the primary flow path is constructed of plastic.

* * * * *